United States Patent [19]

Baker

[11] Patent Number: 4,553,983

[45] Date of Patent: Nov. 19, 1985

[54] PROCESS FOR RECOVERING ORGANIC VAPORS FROM AIR

[75] Inventor: Richard W. Baker, Mountain View, Calif.

[73] Assignee: Membrane Technology and Research, Inc., Menlo Park, Calif.

[21] Appl. No.: 636,474

[22] Filed: Jul. 31, 1984

[51] Int. Cl.$^4$ ............................................. B01D 53/22
[52] U.S. Cl. ......................................... 55/16; 55/158; 585/819
[58] Field of Search .................... 55/16, 158; 585/818, 585/819

[56] References Cited

U.S. PATENT DOCUMENTS

| | | | |
|---|---|---|---|
| 2,159,434 | 5/1939 | Frey | 55/16 X |
| 2,388,095 | 10/1945 | Stahly | 55/16 |
| 2,617,493 | 11/1952 | Jones | 55/16 |
| 3,043,891 | 6/1962 | Stuckey | 210/640 X |
| 3,062,905 | 11/1962 | Jennings et al. | 55/16 X |
| 3,367,504 | 2/1968 | Westmoreland | 210/321.1 |
| 3,417,870 | 12/1968 | Bray | 210/321.1 |
| 3,903,694 | 9/1975 | Aine | 55/16 X |
| 3,911,080 | 10/1975 | Mehl et al. | 55/16 X |
| 4,115,465 | 9/1978 | Elfert et al. | 585/819 |
| 4,119,417 | 10/1978 | Heki et al. | 55/158 |
| 4,243,701 | 1/1981 | Riley et al. | 55/158 X |
| 4,311,594 | 1/1982 | Perry | 55/16 X |
| 4,386,944 | 6/1983 | Kimura | 55/16 |
| 4,444,571 | 4/1984 | Matson | 55/16 |

FOREIGN PATENT DOCUMENTS 97223   7/1980   Japan .................... 55/16

OTHER PUBLICATIONS

McCandless, "Separation of Aromatics and Naphthenes by Permeation Through Modified Vinylidene Fluoride Films", Ind. Eng. Chem. Process Des. Develop., vol. 12, No. 3, 1973 (Jul.), pp. 354–359.
EPA, "Control of Volatile Organic Emissions from Existing Stationary Sources–vol. 1: Control Methods for Surface-Coating Operations", EPA-450/2-76-028.
Rogers et al., "Separation by Permeation Through Polymeric Membranes", *Recent Developments in Separation Science*, vol. 11, pp. 107 to 155 (1972).
Spangler, American Lab., vol. 7, pp. 36, 37 and 40 to 45, 1975.
Riley et al., "Permeability of Plastic Films and Coatings", *Polymer Science and Technology*, vol. 6, pp. 375 to 388 (1974).
Ward et al., *J. Membr. Sci.*, vol. 1, pp. 99 to 108, (1976).
Billmeyer, Jr. *Textbook of Polymer Science*, (Wiley Interscience, N.Y. 1970).
H. Strathmann, "Trennung von Molekularen Mischungen Mit Hilfe Synthetischer Membranen, Sinkopff, Darmstadt (1979).
H. Strathmann et al., "The Formation Mechanism of Asymmetric Membranes", Desalination, vol. 16, pp. 179 to 203 (1975).
Kremen, "Technology and Engineering of ROHA Spiral-Wound Reverse Osmosis Membrane Modules", *Reverse Osmosis and Synthetic Membranes*, S. Sourirajan (Ed.) National Research Council of Canada Publication No. 15627, Canada, pp. 371–385 (1977).

*Primary Examiner*—Robert Spitzer
*Attorney, Agent, or Firm*—Sughrue, Mion, Zinn, Macpeak and Seas

[57] ABSTRACT

A process for recovering and concentrating organic vapor from a feed stream of air having an organic vapor content of no more than 20,000 ppm by volume. A thin semipermeable membrane is provided which has a feed side and a permeate side, a selectivity for organic vapor over air of at least 50, as measured by the ratio of organic vapor permeability to nitrogen permeability, and a permeability of organic vapor of at least $3 \times 10^{-7}$ cm$^3$ (STP) cm/cm$^2$ sec.cm Hg. The feed stream is passed across the feed side of the thin semipermeable membrane while providing a pressure on the permeate side which is lower than the feed side by creating a partial vacuum on the permeate side so that organic vapor passes preferentially through the membrane to form an organic vapor depleted air stream on the feed side and an organic vapor enriched stream on the permeate side. The organic vapor which has passed through the membrane is compressed and condensed to recover the vapor as a liquid.

16 Claims, 4 Drawing Figures

PROCESS FOR RECOVERING ORGANIC VAPORS FROM AIR

FIELD OF THE INVENTION

The present invention relates to a process for recovering organic vapors from air, and more particularly to a process for recovering such vapors by selective permeation through a separation membrane.

BACKGROUND OF THE INVENTION

Many industrial processes produce waste air streams, often hot, containing low concentrations of organic solvents. For example, solvent containing air streams are produced as a result of solvent vaporization in the drying of synthetic fibers and films, plastics, printing inks, paint lacquers, enamels and other organic coatings. In addition to being a pollution problem, these streams represent a waste of valuable resources in the form of lost solvent and in the wasted energy in the heated air. The total value of the solvent and heat loss in these processes is very large. For example, it has been estimated that 200 million barrels per year of solvent are being recovered by the existing processes and that an even larger volume of solvent is being discharged or lost.

Since the early 1970's the industries producing solvent containing exhaust air streams have been under increasing economic and regulatory pressure. One problem is the increasing cost of energy. Many of these streams are produced in high-temperature industrial ovens where, because of the explosion danger, strict limits govern the concentration of solvent vapors permitted in the oven. One method used to stay within these limits is to ventilate the oven chamber with fresh air in sufficient volume to dilute the maximum vapor concentration to acceptable levels. This method wastes large amounts of process heat in the exhaust gas. Of even greater economic significance is the solvent contained in these exhaust streams. In the past, these organic solvent vapors were simply discharged because air pollution regulations were lax and the solvents were inexpensive. Presently, however, some form of treatment is required to meet air pollution standards. Most of these processes only prevent air pollution, and despite the increased value of the solvent, its recovery is still not economically practical except for very large exhaust streams and under particularly favorable conditions.

One could, in principle, recover the solvent from oven exhaust air directly by compressing the entire air stream to a pressure at which the solvent would condense. However, effluent streams typically contain only small volumes of organic solvent, such as 1 volume % organic solvent vapor, and because of the large amounts of energy required to highly compress such a large volume of gas, this approach is economically impractical.

The United States Environmental Protection Agency (EPA) has published a whole series of reports on the problem of solvent vapor emissions. One of the most pertinent is "Control of Volatile Organic Emissions from Existing Stationary Sources—Volume 1: Control Methods for Surface-Coating Operations", EPA-450/2-76-028, November 1976, which contains a description of the solvent vapor recovery systems known in 1976. The vapor control systems described are incineration, carbon adsorption, condensation, and scrubbing. Of these, incineration and carbon adsorption are the most widely used processes. In incineration, the vapor-containing stream is mixed with natural gas and burned in a high temperature incinerator. In carbon adsorption, the feed solvent vapor stream is passed through a bed of high surface area carbon beads onto which vapor is sorbed. Periodically, the carbon bed is eluted with steam or hot gas to produce a concentrated product containing the adsorbed solvent. Both processes are widely used, but are expensive.

The high permeability of some rubbery polymers, particularly silicon rubber and polyacrylonitrile (pan)-butadiene, to organic vapors and their low permeability to nitrogen and oxygen is known. See, for example, Rogers et al, "Separation by Permeation Through Polymeric Membranes", in *Recent Developments in Separation Science*, Volume II, pages 107 to 155 (1972), and the paper by Spangler, American Lab 7, 36, 1975. Rogers et al, for example, disclose that the permeability of poly(-butadiene-acrylonitrile, 35%) rubber to nitrogen and oxygen is much less than to certain organic materials such as methanol, carbon tetrachloride, ethyl acetate, benzene and methyl ethyl ketone. Spangler discloses trace vapor detectors employing dimethylsilicone membrane separators for detecting 2,4,6 TNT or DNT in ambient air. Despite this theoretical knowledge, however, no practical sytem for using such characteristics in a solvent recovery sytem is known.

Composite membranes are also known in the art. These membranes are usually used in reverse osmosis systems, but they have also been used for gas separation. Typical composite membranes are disclosed by Riley et al, "Permeability of Plastic Films and Coatings", in Polymer Science and Technology, Volume 6, page 375 to 388 (1974), U.S. Pat. No. 4,243,701 to Riley et al and Ward et al, *J. Membr. Sci.*, Volume 1, pages 99 to 108, 1976. Composite membranes generally comprise a thin barrier layer of a permselective membrane and a microporous membrane support layer. The Riley et al article discloses a composite membrane comprising a porous cellulose nitrate-cellulose acetate supporting membrane and a thin semipermeable barrier of cellulose triacetate which can be formed directly in a thickness of about 250° Å to 500° Å upon the finely porous surface of the support membrane by dipping or by wicking from a dilute solution of cellulose triacetate in chloroform. The composite membrane can be given a spiral-wound construction and is employed in reverse osmosis for single-stage seawater desalination. The Riley at al patent discloses composite membranes which can be used for the separation of gases comprising a porous support membrane of cellulose nitrate-cellulose acetate or polysulfone and a thin film of a semipermeable material such as dimethyl silicone rubber. The patent indicates that the composite can be used in the form of a spiral wound element, and discloses selectivities of dimethyl silicone polymer which vary from 2.0 for $O_2/N_2$ up to 50 for $SO_2/N_2$. The Ward et al article discloses composite membranes in which the barrier layer comprises an ultrathin silicone-polycarbonate membrane, and suggests that the composite membrane can be used to produce oxygen-enriched air or nitrogen-enriched air.

Spiral wound modules are known in the art and have already been applied to the separation of gases, for example, by the Separex Corporation which in a brochure has described the use of a cellulose acetate membrane to separate hydrogen and $CO_2$ from gases such as methane, ethane and CO.

U.S. Pat. No. 3,903,694 to Aine describes a method of recycling some of the unburnt hydrocarbons in the engine exhausts to the air inlet gas of the engine. Aine discloses that the process preferably is a concentration driven process rather than a pressure driven process. Thus, both the feed gas and the exhaust gas are close to ambient pressures. This means that only a portion of the hydrocarbon in the exhaust gas can diffuse across to the air inlet gas before both sides have the same hydrocarbon concentration and the process stops. For example, if the exhaust gas contains 1000 ppm hydrocarbon, then (assuming the exhaust gas and the feed gas volumes are approximately constant), the process will stop when the air inlet gas and the exhaust gas both reach 500 ppm hydrocarbon. This process is therefore a method of only recycling a portion of the hydrocarbon, at best 50%, and in practice probably a lot less. Moreover, this is not a process for concentrating the hydrocarbon vapor. The concentration of hydrocarbon on the air inlet (product side) of the membrane must always be less than on the exhaust (feed side) of the membrane. The Aine patent does disclose as a non-preferred embodiment, the possibility of employing a reduced pressure on the product side, but does not disclose recovery of the separated product as a liquid or a method of achieving high concentrations of organic vapor in the product.

U.S. Pat. No. 2,617,493 describes a process for removing nitrogen and other gases from hydrocarbon feed streams that generally contain 50% or more of the hydrocarbon gas. In this patent, because of the very high value of the organic feed, no hydrocarbon can be lost with the nitrogen. Thus, a multi-stage process is described to obtain a complete separation between the two components. This multi-stage system is economically impractical for feed streams containing low concentrations of components to be recovered. The membranes described in this patent are preferably between 12.5 and 123 μm thick.

Barrier membranes have been reported in the literature that appear to have a high organic vapor to nitrogen selectivity, α, defined as $$\alpha = \frac{\text{Permeability organic vapor } (P_{vap})}{\text{Permeability nitrogen } (P_{N2})},$$

where $P_{vap}$ and $P_{N2}$ are measured separately on the pure vapor or nitrogen streams. However, this high apparent selectivity would not be expected to hold when the membranes are tested with vapor/nitrogen mixtures. This is because, with these mixtures, the high sorption of organic vapor by the membrane would be expected to swell the membrane so drastically that the membrane would no longer be a selective barrier to nitrogen.

Thus, despite the various diverse teachings in the prior art relating to the problem of solvent vapor emissions and the availability of membranes highly permeable to organic vapors, there has not been a process which recovers organic vapor at low concentrations from air by use of membrane technology.

SUMMARY OF THE INVENTION

It is an object of the present invention to provide a process for efficiently recovering organic vapor from an air feed stream containing a low concentration of organic vapor.

Another object of the present invention is to provide such a process which can be used with high temperature air streams.

A further object of the present invention is to provide such a process which permits recovery and reuse of the solvent.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purposes, the present invention provides a process for recovering and concentrating organic vapor from a feed stream of air having an organic vapor content of no more than 20,000 ppm by volume, comprising providing a thin semipermeable membrane which has a feed side and a permeate side, a selectivity for organic vapor over air of at least 50, as measured by the ratio of organic vapor permeability to nitrogen permeability, and a permeability of organic vapor of at least $3 \times 10^{-7}$ $cm^3$ (STP) $cm/cm^2$ sec.cm Hg, passing the feed stream across the feed side of the thin semipermeable membrane while providing a pressure on the permeate side which is lower than the feed side by creating a partial vacuum on the permeate side such that organic vapor passes preferentially through the membrane to form an organic vapor depleted air stream on the feed side and an organic vapor enriched stream on the permeate side, and compressing and condensing the organic vapor which has passed through the membrane to recover the vapor as a liquid.

The thin semipermeable membrane preferably is a rubbery material under the conditions of organic vapor composition of the feed stream and temperature of the feed stream, and preferably has a glass transition temperature (Tg) at least 20° C. below the temperature of the feed stream.

It is also preferred to recirculate the organic vapor depleted air stream, especially when the feed stream has a temperature of at least 50° C., such as at least 100° C.

Preferably, the feed stream has an organic vapor contet of from 0.1 to 1 volume %, the selectivity of the membrane is between 100 and 10,000, the permeability of the membrane to organic vapor is above $1 \times 10^{-6}$ $cm^3$ (STP) $cm/cm^2$ sec.cm Hg, the total pressure on the product side is from 0.2 to 2 cm Hg, and the total pressure on the feed side is from 80 to 100 cm Hg.

In one preferred embodiment of the present invention, the thin semipermeable membrane is provided as part of a composite membrane comprising a microporous membrane support layer wherein the thin semipermeable membrane is in the form of a barrier coating layer on the support. The support membrane preferably comprises an organic solvent resistant ultrafiltration membrane.

Frequently, when the recirculated air is hot, the energy recovered by recirculating it to the process outweights the energy of compressing the organic vapor enriched stream. The value of the recovered solvent generally is more than sufficient to pay for the capital cost of the membrane unit.

It is to be understood that both the foregoing general description and the following detailed description are exemplary and explanatory, but are not restrictive of the invention.

DETAILED DESCRIPTION OF THE INVENTION

Figure 1:
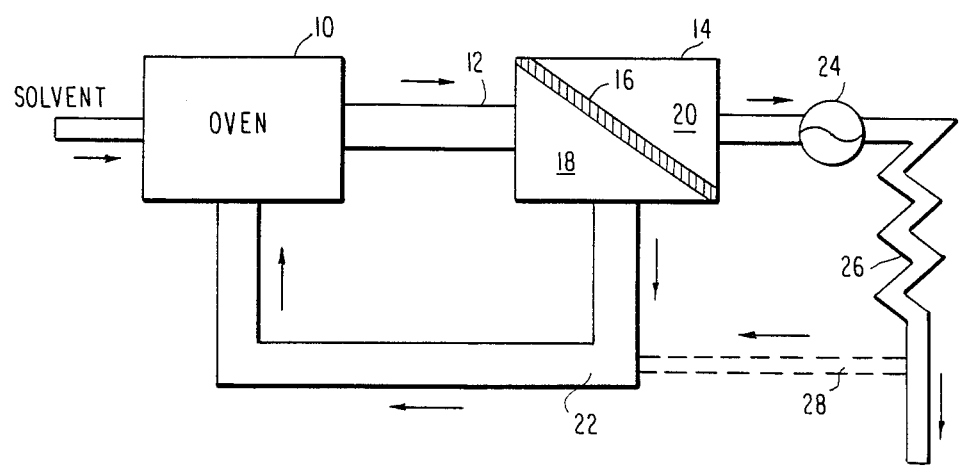
FIG. 1 schematically illustrates an apparatus which can be used to perform the process of the present invention.

In the present invention, a feed stream containing air and organic vapor is passed across a thin semipermeable membrane. The feed stream which can be treated in the process of the present invention can arise from a wide variety of sources. The feed streams which can be used in the present invention generally are solvent emission feed streams which contain the organic solvent in low concentrations of no more than 20,000 ppm by volume (2 vol. %), for example, from 0.01 to 1.0% by volume, such as, for example, 0.1 to 0.5% by volume. Although the sources of solvent emission are varied, the composition of the emission streams are similar. Along the large number of solvents used industrially, naphtha ($C_4$ to $C_{10}$ hydrocarbons) represents more than half of the total solvent emissions, and the eight solvents naphtha, toluene, xylene, perchloroethylene, trichloroethane, ethyl alcohol, methyl alcohol, and acetone together represent almost eighty percent of the total solvent emissions. The term organic "vapor" as used in the present specification refers to a material which is liquid at ambient conditions and gaseous at the conditions of operation of the process of the invention, as opposed to a "gas" which, as used in the present specification, refers to a material which is in the gaseous state at ambient conditions and at the conditions of operation.

To illustrate the processes that produce solvent emissions, examples of a number of industrial processes that produce significant quantities of recoverable organic solvents will now be described. One such process is solvent degreasing which is principally used in the metal working industry to remove fats, waxes, and dirt from parts prior to surface treatment. Depending on the size and type of cleaning system, between 10 and 50 tons of solvent are lost per year per unit. Most plants use naphtha or chlorinated hydrocarbon solvents. Typical effluent solvent concentrations are in the range of 0.1 to 0.5 vol. %, typical effluent temperature are 20° C. to 25° C., and typical effluent stream flows are 200 to 1000 (Scfm).

Another source of solvent emissions arises from petroleum storage tanks. Hydrocarbons are released as emissions from cude oil and distillate storage tanks, as working losses during tank emptying and filling operations, and as storage losses resulting from hydrocarbon leaks through the seals of floating roof storage systems. Typical emissions from petroleum liquid storage tanks are $C_4$ through $C_6$ hydrocarbons, $C_4$ and $C_5$ olefins, and small quantities of propane, typical emission temperatures are 20° to 25° C., and typical effluent stream flows are 2500 (Scfm). The total capacity of refinery storage systems is on the order of 35 to 50 million tons of crude oil and 20 to 30 million tons of gasoline. The size of the problem is thus very large. For the sake of calculation, it may be assumed that the air streams arising from petroleum storage tanks contain approximately 0.2 vol. % hydrocarbon; i.e., 25% of the lower explosion limit (LEL).

Still another source of solvent emissions is the dry cleaning industry. Petroleum naphtha and chlorinated hydrocarbons are the two most commonly used solvents in the dry cleaning industry. Self-service and small commerical cleaners use chlorinated hydrocarbons almost exclusively, while most industrial cleaners use petroleum naphtha. The solvent is removed in a drying operation by passing a heated air stream through the articles being cleaned. The exit air from this drying operation is normally at 50° to 70° C., contains between 0.1% and 1.0 vol. % solvent, and a typical effluent stream flow of 100 to 1000 (Scfm). The dry cleaning industry is characterized by a large number of very small sources of solvent emissions. Typical solvent emissions of a small, coin-operated cleaning operation are approximately 0.3 ton per year. Commercial operations typically each produce between one and five tons per year, while industrial operations produce between twenty and fifty tons per year. Dry cleaning solvent emissions are not produced at a uniform rate. Most plants operate only five to six days per week, eight hours a day. Moreover, the batch-type nature of the dry cleaning process produces intermittent effluent streams. Dry cleaning solvent recovery plants, therefore, must be designed to cope with peak exhaust rates, and will be over capacity or idle for much of the day. The recovered solvent can be reused directly in the dry cleaning process. This credit can be particularly significant for chlorinated hydrocarbon solvents, which typically cost $.50/kg, almost five times the cost of naphtha.

A further source of solvent emissions arises from the printing and coating of paper and fabrics in which there is produced large amounts of hot solvent-laden exhaust air streams containing higher napthas (such as octane and decane) -xylene-toluene as the solvent or toluene alone. It is estimated that in excess of 500,000 tons of solvent are released annually by all graphic art and fabric printing and coating industries. The bulk of the solvent emissions are produced in intermediate to large operations using from 10 to 500 tons of solvent annually. The solvent drying ovens used in printing and coating operations typically produce emissions having a temperature of 100° to 150° C., such as, 120° to 130° C., seldom in excess of 150° to 200° C.

Solvent emissions also arise from the coating of pressure-sensitive adhesive tapes by solvent based processes which typically use toluene, xylene, naphtha, and methyl ethyl ketone. The solvent emissions are typically at a temperature of up to 150° C., and contain 0.2 vol. % of solvent. A typical industrial adhesive coating unit can produce as much as 0.5 to 10 tons of solvent emissions per day, and have a typical effluent stream flow of 2500 to 25,000 (Scfm).

The thin semipermeable membrane employed in the present invention acts as a barrier membrane which performs the separation between organic vapor and air, and accordingly it must be highly permeable to solvents, but relatively impermeable to air. Preferably, the thin semipermeable membrane is present as part of a composite membrane comprising a microporous membrane support layer wherein the thin semipermeable membrane is in the form of a barrier coating layer on the support layer. This type of composite membrane is preferred since it is possible to use mechanically weak rubbery materials as the permselective barrier layer and strong rigid polymers for the support. However, other types of thin semipermeable membranes which are non-composite could also be used, such as Loeb-Sourirajan asymmetric membranes. Finally, both types of membrane could be made in flat sheet or hollow fiber form.

The barrier membranes useful in the present invention should have an organic vapor permeability of at least $3 \times 10^{-7}$ cm$^3$ (STP) cm/cm$^2$ sec.cm Hg, and preferably above $1 \times 10^{-6}$ cm$^3$ (STP) cm/cm$^2$ sec.cm Hg, and most preferably above $3 \times 10^{-6}$ cm$^3$ (STP) cm/cm$^2$ sec.cm Hg. The air permeability of the barrier membrane, as measured by the permeability of $N_2$ in the air, should be no more than 2% of the organic vapor permeability, and preferably no more than between 0.01% to 1% of the organic vapor permeability. Thus, the permeability of the barrier membrane to solvent vapor is at least 50 times higher, and preferably is above 100 times higher and more preferably even higher, such as 200 to 1000 times higher or still higher, such as 10,000 times higher, than the permeability to air as measured by the permeability of $N_2$ in air, to provide a selectivity (or separation factor) of at least 50, and preferably between 100 to 10,000. Selectivity and permeability are somewhat dependent on temperature, pressure and composition of the feed stream. As used throughout the specification and claims, however, the selectivity and permeability referred to are the selectivity and permeability obtained by measuring permeabilities of pure vapor and gas separately at a temperature of 30° C. and at pressure of 5 cm Hg for the gases (nitrogen) and at a pressure for the organic vapor equal to half its vapor pressure at 30° C.

Moreover, because many of the organic vapor streams which are desired to be treated by the present invention are hot, the barrier membrane should be able to withstand temperatures of up to 200° C. Further, in order to prepare thin membrane barrier layers by a solvent casting technique, the membrane barrier should be a polymer which can be prepared from a film forming material that is soluble in organic solvents. In order to achieve the required high permeabilities, the polymers for the membrane barrier preferably are rubbery materials. By rubbery material, it is meant that the polymer is a rubber under the conditions of organic vapor composition and temperature of the feed stream. More precisely, when a material is above its glass transition temperature (Tg) it is considered a rubber. Therefore in the present invention, materials are used whose glass transition point is below the feed stream temperature. The Tg of a rubber can be determined by measuring a number of properties, but here we refer to the temperature at which a sudden change occurs in the elastic modules as described in standard texts such as Textbook of Polymer Science, by F. W. Billmeyer, Jr. (Wiley Interscience, New York, 1970). Typical glass transition temperature for materials of interest here in the absence of solvent are: poly(dimethylsiloxane), 155° K.; cis-polybutadiene, 164° K.; cis-polyisoprene, 200° K.; and poly(butene-1), 250° K. The glass transition temperature, Tg of a material can be lowered by the presence of plasticizers (including sorbed solvents). Thus, it might be possible, for example, to use a polymer which ordinarily is glassy as a membrane barrier material which become sufficiently plasticized by the solvent vapors to become rubbery in use, for example, cellulose acetate with a normal Tg of 380° K. could be sufficiently plasticized when exposed to solvent streams containing alcohol, acetone, or chlorinated solvents to lower its Tg to below the temperature of an ambient feed vapor stream. The Tg of a membrane in its environment should be at least below the temperature of the feed stream, and preferably at least 20° C. below the temperature of the feed stream.

Although rubbery materials are preferred for the membrane barrier layer because of their high permeability, non-rubbery materials can also be used. Normally, these non-rubbers, i.e., amorphous, glassy or crystalline polymers will have much lower organic vapor permeability than rubber but will also have higher selectivities for organic vapors over air. These materials may therefore be preferred in a few applications when it is desired to concentrate the organic vapor in the feed to a very high degree. Polymers that could be used in these cases include cellulose acetate, polysulfone, acrylate and methacrylate polymers and copolymers, polyesters, and polyamides.

Preferably, the solvent permeable membrane barrier is a high temperature rubber, such as, for example, nitrile rubber, neoprene, polydimethylsiloxane, chlorosulfonated polyethylene, polysilicone-carbonate copolymer, fluoroelastomer, polyvinyl chloride, polyurethane, cis-polybutadiene, cis-polyisoprene and poly(butene-1).

Nitrile rubber can be used to a temperature of about 200° C., is available in a number of grades, and one such rubber can be obtained from Chem Samples, Ontario, New York under the designation #524. Neoprene can be used to a temperature of about 150° C., and one such rubber can be obtained from Chem Samples under the designation #504. Polydimethylsiloxane can be used to a temperature of about 200° C., and materials for preparing it (such as polymerizable oligomers or linear polymers) can be obtained from Dow Corning or from General Electrical, Waterford, New York. Chlorosulfonated polyethylene can be used to temperatures of about 150° C., is soluble in toluene, is available in several grades, and one such rubber can be obtained from DuPont under the designation Hypalong 20. Polysilicone-carbonate copolymer is available from General Electric, Waterford, New York, under the designation MEM-213, fluoroelastomer is available from 3M under the designation Fluorel and can be used at temperatures of about 200° C. for extended periods and up to 350° C. for short periods. Polyvinyl chloride can be employed up to temperatures of more 200° C., can be easily plasticized to vary permeability and physical properties and can be obtained from Goodrich. The above materials can be formed into barrier membranes by a solvent casting technique.

The membrane barrier layer should be thin, and generally has a thickness between 0.1 and 10 microns, preferably between 0.1 and 2.5 microns, such as between 1 and 2 microns, and still more preferably below 2 microns such as between 0.5 and 1 microns.

The microporous membrane support layer employed in the composite membrane should have a flow resistance which is very small in comparison to the permselective barrier layer. Preferably, the support layer should have a large number of small closely spaced pores in its surface layer. A surface porosity of at least 10% is desirable, and the support membrane should not contain any surface pores with a diameter greater than 1 μm. Also, the support membrane should not be attacked by any of the solvents which are used in the preparation of the high performance barrier membrane, and should not be brittle and fragile when dry since this makes the membranes difficult to handle. Many of the film forming materials for forming the barrier membranes which can be used in the present invention are only soluble in aggressive slovents such as toluene, tetrahydroforan or methylene chloride, and thus care must be taken in choosing the support membrane. A useful support membrane is a crosslinked polyimide solvent resistant ultrafiltration membrane, such as sold by Nitto Electric Industrial Co., Ltd. of Osaka, Japan, for example under the designation NTU 4220, or a polysulfone solvent resistat ultrafiltration membrane such as sold by Nitto Electric Industrial Co., Ltd., under the designation NTU 3050. Polysulfones support membranes are particularly useful with silicone rubber barrier membranes, while polyimides can be used with silicone rubber. neoprene and other rubbery barrier membranes. Other suitable support membranes are, for membranes are for example, ultrafiltration membranes made by the procedures described in an article by H. Strathmann, K. Kock, P. Amar and R. W. Baker, entitled "The Formation Mechanism of Asymmetric Membranes", Desalination, Volume 16, pages 179+ (1975), using the polymers such as polyvinylidene fluoride (Kynar 461, Penwalt Corp., Philadelphia, Pa. which is particularly useful for barrier membranes of neoprene, silicone rubber and other rubbery materials and aromatic polyamide (Nomex 450, DuPont, Wilmington, Delaware) which are particularly useful for barrier membranes of neoprene, silicone rubber and other rubbery materials. Simple isotropic supports, such as microporous polypropylene (Celgarde 2400, Celanese Corp., Charlotte, South Carolina) and microporous polytetrafluoroethylene (Plastolon, Gortex Association, Elkton, Maryland) can also be used. The support membrane generally has a thickness of 100 to 300 microns, preferably about 150 microns. The thickness of the support layer does not affect the properties of the final composite membrane provided that the permeability of the support layer is high compared to the permselective barrier layer.

Preferably, the composite membrane contains a web layer to reinforce the support membrane layer. The composite membrane thus contains the web layer, the microporous support layer and the barrier layer in that order. The web layer preferably is a polyester web such as sold under the designation Hollytex 3329, by Eaton-Dikeman, Mount Holly Springs, Pennsylvania, but another materials can be used. The web layer preferably has a thickness of from about 100 to 200 microns, such as 125 microns. The web layer need not be used in the composite membrane.

The composite membrane preferably is prepared by forming the microporous support on the polyester web material, and coating this support membrane with the ultrathin barrier coating. The procedure used to form the support membrane can be identical to that widely used in the membrane industry to make ultrafiltration membranes. References describing the preparation of these membranes are: H. Strathmann, K. Koch, P. Amar and R. W. Baker. "The Formation Mechanism of Asymmetric Membranes", Desalination 16, 179 (1975), and H. Strathmann, "Trennung von Molekularen Mischungen Mit Hilfe Synthetischer Membranen", Stinkopff, Darmstadt (1979).

The barrier coating layer can be formed on the support layer in accordance with procedures such as described in U.S. Pat. No. 4,243,701 to Riley et al and by the article of W. J. Ward III, W. R. Browall and R. M. Salemme, "Ultrathin Silicone Polycarbonate Membranes for Gas Separation Processes", J. Membrane Sci. 1, pages 99, (1976), which are incorporated herein by reference.

For example, a support membrane from a feed roll can be passed through a coating station, after which it is passed through a drying oven, before being wound up on a product roll. The coating station can be a simple dip coating tank which contains a dilute solution of the barrier polymer or a barrier polymer precursor and coats the traveling membrane support with a liquid layer 50 to 100 μm thick. After evaporation of the solvent, a barrier layer in the form of a polymer film 0.5 to 10.0 micron thick is left on the support membrane. This technique works well provided the support membrane is able to withstand the solvent used in the dip coating. In one experiment, readily available polysulfone ultrafiltration membranes were used as the support membrane and polydimethylsiloxane was used as the barrier layer. Polydimethylsiloxane prepolymer and a curing agent were dissolved in a freon solvent that does not attack the support membrane. With solvents that attack the support membrane, a water casting system can be used. In the water casting system, a thin liquid film of the polymer solvent solution is allowed to spread on the surface of the water bath. The solvent evaporates from the liquid film and the resulting polymer layer is picked up by kiss coating onto the microporous membrane support. This technique requires more precise control than the dip coating method, but thinner films are possible.

The composite membranes can be used in a number of different forms, such as, for example, flat sheet membranes, spiral modules, or composite hollow fiber membranes. Each of these forms is well known in the art. A winding machine can be used to make spiral modules. As the first step in preparing a spiral module, the composite membrane is cut to size and folded around a feed spacer material, usually a polypropylene mesh material. The composite membrane is then moved to the wind-up machine where it is placed on top of a product spacer material. The wind up machine comprises a product collection pipe which is placed in the jaws of a motor or hand driven clutch, with the product spacer material being glued to the pipe. During the winding operation, the material being wound is kept under a slight tension and the membrane envelope is glued along the edges and ends. When completely wound up, a layer of fabric reinforced tape is used to seal the module. A number of modules have been made which are two inches in diameter and six to twelve inches long. The total membrane surface area of these modules is approximately three to six square feet.

In the present invention, a pressure differential is maintained between the side of the membrane which is brought into contact with the feed stream, and the opposite side of the membrane, with the lower pressure being on the opposite side. This opposite side is referred to herein as the permeate or product side.

Generally, the system is operated with a partial vacuum on the permeate side and close to, but higher than, ambient pressure on the feed side. In this way compression energy need be put into only the small volume of permeate gas and vapor, rather than the very large volume of feed stream. The term partial vacuum as used herein refers to a pressure which is lower than ambient, generally atmosphberic, pressure and above at total vacuum. Typical operating conditions are 0.2 cm to 2 cm Hg on the product side and 80 to 100 cm Hg on the feed side, ambient pressure being 76 cm Hg.

In the process of the present invention, the ratio of feed pressure to product pressure is relatively high, on the order of 50 to 100. Typically, the feed pressure is 4 to 9 cm Hg above atmospheric pressure, i.e., 80 to 85 cm Hg absolute. The feed pressure, however, can be higher if this pressure is required to circulate the feed gas through the membrane modules. In view of high ratio of feed pressure to product pressure, almost all of the organic solvent vapor can be removed from the feed side of the membrane, and a product stream is obtained which is highly concentrated in organic vapor compared to the feed. In the present invention, with a concentration of vapor in the feed stream of, for example, about 0.5 volume per cent, a concentration of vapor in the vapor enriched stream on the permeate side can be obtained of, for example, 10 to 95 volume percent, such as 10 to 70 volume percent, or 15 to 50 volume percent. Such highly concentrated product streams are ideally suited for recovery of the vapor as a liquid by compression and condensation. In the present invention, the recovery of vapor from the feed stream, that is, the amount of vapor removed from the feed stream as compared to the amount of vapor in the feed stream can be varied and depends on such factors as the flow rate of the feed stream, the recirculation rate of the feed stream if it is being recirculated, the size of the thin semipermeable membrane, that is, its surface areas and the like. It is possible, depending on the system, to obtain almost complete removal of the organic vapor from the feed stream.

In the process of the present invention, a concentration of the organic vapors on the permeate side occurs inasmuch as no diluting stream is fed onto the permeate side so that the only components present on the permeate side are those which have passed through the semipermeable membrane.

Inasmuch as the organic vapor partial pressure in the feed streams employed in the present invention are usually in the range of 0.5 to 1.0 cm Hg, this means that very low pressures must be maintained underneath, that is, on the permeate side of the membrane surface. In spiral wound modules, in particular, the vapor pressure of the vapor on the product side builds up to create a back pressure on the product side of the membrane inside typical membrane modules, and the back pressure can be very high (>5 cm Hg) for gas modules that have been used in the prior art. Inasmuch as these modules normally are used at permeate pressures of from 15 cm Hg for oxygen-nitrogen separations, to many atmospheres for $CO_2$-methane seaprations, this back pressure is not a problem. In the present invention, however, with the use of very low pressure on the product side the back pressure must be reduced or eliminated. This can be achieved by using spiral wound modules with very open or porous product side spacer materials such as one or two layers of polyethylene net, for example, VEXAR 5465 from E.I. Dupont deNemours.

The membranes employed in the present invention are capable of being operated at high temperatures, of, for example, up to 150° C. or more. This is an attractive property of the membranes, since many vapor feed streams are quite hot. Removal of the vapor from hot feed streams without cooling allows the vapor depleted stream to be recycled to the oven, thus recovering the heat content of the air.

Referring now to the drawings, FIG. 1 shows an apparatus for practicing a preferred embodiment of the present invention in which the feed stream is at high temperature.

As shown in the drawing, an oven 10 is connected by a feed line 12 to a membrane separation unit 14 containing a composite membrane 16. Membrane 16 divides unit 14 into a feed section 18 and a permeate section 20. A recirculation line 22 connects feed section 20 to oven 10. Solvent-laden hot exhaust air from oven 10 is fed into feed section 18 of unit 14 through feed line 12. A partial vacuum is applied to permeate section 20 and organic vapor passes through membrane 16 to form a concentrated solvent vapor stream. The organic vapor in the vapor stream in permeate section 20 can be cooled, compressed in a compressor 24 and condensed in a condensor 26 to recover the solvent, while the hot solvent-depleted air in feed section 18 can be recirculated back to oven 10 through line 22. Condensor 26 can be provided with a bleed stream 28 to return uncondensed solvent to oven 10 via recirculating line 22.

In many cases, the permeate vapor stream will be sufficiently concentrated to spontaneously condense as it is raised to ambient pressure. In this case, the preferred compressor is a liquid ring compressor/pump. In this pumping system condensed vapor provides the sealing liquid for the pump. To prevent overheating, a heat exchanger is built into the pump and is used to remove the latent heat of condensation released by the condensing vapor. Thus, the pump combines the function of the compressor 24 and the condensor 26.

A few simple calculations illustrate the energy savings that are possible with the process of the present invention. The results of these calculations will vary considerably, depending on the particular application, oven temperature, solvent used, and other process variables. By way of example, consider a small varnish drying oven which operates at 180° C. and evaporates 10 kg of methyl ethyl ketone per hour. If it is assumed that the exhaust gas is at 50% of the lower explosion limit (the maximum allowable concentration under the National Fire Protection Rules) then the MEK content of the exhaust gas will be approximately 1 volume % or 0.76 cm Hg. The MEK vapor pressure on the product side of the membrane must be reduced to some value below this to cause the acetone to permeate the membrane. Let us denote this reduced value as $P_1$. The product gas pressure must then be increased to the point where the MEK vapors will condense. This pressure will be denoted as $P_2$. If the temperature of the MEK were maintained at the exhaust gas temperature of 180° C., $P_2$ would be a very high pressure and the energy cost of compression would be excessive. However, cooling of the solvent vapor by a simple condensor can easily reduce its temperature to 65° C. at which point $P_2$ is only 50 cm Hg.

The theoretical or minimum work required to compress a gas depends on the pressure ratio $P_2/P_1$ and is independent of the specific feed and product stream pressures. Per mole of compressed gas, this work, W, is $$W = RT ln(P_2/P_1).$$

Clearly, it is desirable to keep the compression ratio $P_2/P_1$ as small as possible to minimize energy costs. However, $P_1$ should also be kept small in order to maximize the driving force for solvent flow across the membrane. The optimum balance between minimum compression ratio (and hence minimum capital cost) will depend on the cost of the membrane used. For the present example, assuming the value for $P_1$ of 20% of the vapor pressure of the solvent in the feed, i.e., 20% of 0.76 cm Hg or 0.15 cm Hg, then since $P_2$ is 50 cm Hg, the compression ratio is 350 and the work of compression is 17 BTU per ft$^3$ (STP) of MEK vapor or 13.5 BTU per mole of MEK.

This work of compression must then be subtracted from the heat content of the hot gases returned to the oven to obtain the energy balance for the process. For each mole of MEK recovered, 2240 liters of air (at STP) are returned to the oven. This air has a heat content at 180° C. over ambient air at 25° C. of 440 BTU. Thus, more than 420 BTU of heat are saved per mole of MEK removed.

Several assumptions are implicit in these energy estimates. It has been assumed that the compressor operates at 100% efficiency, when in fact 70% might be more reasonable. More significant is the fact the energy used in drying is usually supplied as heat from the combustion of gas or oil. In order to compare the two, the work of compression must be adjusted for the thermodynamic inefficiency of conversion of heat to work. The actual energy required to compress the gas should therefore be multiplied by a factor of 2.5 to reflect this fact. Nonetheless, even after these corrections are made, the energy saved is still considerable, in the region of 350 to 400 BTU per mole of MEK recovered. At an energy cost of $4/million BTU this corresponds to approximately 3¢/kg of MEK recovered. The value of the recovered solvent is even higher, at least 30¢/kg of MEK recovered.

The value of energy and solvent recovered must be offset against the capital cost of the membrane unit. With a membrane having a permeability to MEK (at STP) of 100 cm$^3$mm/cm$^2$sec·cm Hg×10$^7$, and a barrier membrane 1 micron thick, the permeability corresponds to 2.2 kg/ft$^2$·day·cm Hg. With an actual vapor pressure driving force in the range of about 0.6 cm Hg, a conservative solvent flux of about 1 kg/ft$^2$ day is obtained. The cost of the membrane equipment can be estimated from the known costs of other membrane processes such as reverse osmosis (RO). RO membrane modules are similar to those which can be in the present process, and, as a first approximation, it would be reasonable to assume that the costs are similar. Based on this assumption, the total cost of the equipment is unlikely to be more than $10/ft$^2$ of membrane area (including the cost of the compressors) for a large system with a membrane area of greater than 10,000 ft$^2$ and $30/ft$^2$ for a small system with a membrane area of less than 100 ft$^2$. Based on a three-year membrane lifetime and 50% use, this corresponds to a capital cost of approximately 2.0¢/kg of MEK recovered for a large system and 6.0¢/kg of MEK recovered for a small system. For a large system, the total cost balance per kg of MEK removed is therefore:

| | |
|---|---|
| Value of energy removed | 3.0¢ |
| Cost of energy of compression | (0.5) |
| Value of MEK recovered | 30.0 |
| Cost of membrane replacement | (2.0) |
| Net Recovered Value/kg MEK | 30.5¢ |

This net recovered value corresponds to a total annual return of approximately $52/ft$^2$ of membrane and thus the payback time is of the order of two to three months. For a small system, the economics are still good, but because of the higher capital cost of these units the payback time is somewhat longer. The net recovered value per kg of MEK recovered is 23.5¢ and the payback time is approximately eight to nine months.

The process of the present invention has numerous advantages over existing techniques for treating solvent-laden emissions. Thus, for example, when treating high temperature emissions, the energy cost of oven drying is reduced by recovering the energy otherwise lost in the hot exhaust gas. Moreover, the solvent previously lost from the system is recovered and is available for reuse. Further, the process is amenable to small-scale, low-volume applications. The process of the present invention can be continuous. The batch-type, multi-step operations required to recover solvents by carbon absorption or liquid scrubbing processes are avoided. The membrane process of the present invention is therefore potentially more reliable and more amenable to automatic operation than existing processes.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

An ultrathin silicone rubber composite membrane was prepared by coating a microporous ultrafiltration support membrane with a thin layer of silicone rubber prepolymer and catalyst in a suitable solvent. A dip coating procedure was used to doctor a solution of polydimethylsiloxane prepolymer (General Electric RTV-615A-B, Waterford, New York) dissolved in 1,1,2-trichloro-1,2,2-trifluoroethane onto the support membrane. The support membrane used was a 140 micron thick polysulfone ultrafiltration membrane produced by the NITTO Electric Industrial Company, Osaka, Japan, and sold under the trade name NTU-3050. Based on its ultrafiltration performance, this membrane has a pore size in the range 50 to 200 Å. A polyester web having a thickness of 160 microns was attached to the support membrane.

After being coated with the prepolymer solution, the resulting membrane was passed through a curing oven at 100° C. for 2 to 3 minutes before winding on a take-up roll. Typically, the concentration of the prepolymer solution was between 2 and 10% and the resulting silicone polymer barrier film, as judged by its nitrogen flux, was 1 to 10 microns thick.

EXAMPLE 2

A thin silicone rubber composite membrane prepared using a procedure described in Example 1 above and having a nominal thickness of 8 μm for the silicone rubber barrier was formed into a spiral wound test module 2" in diameter and 6" long. The procedure used to prepare this module is generally described in J. Westmorland's U.S. Pat. No. 3,367,504 (February 1968), D. Bray's U.S. Pat. No. 3,417,870 (December 1968) and S. S. Kremen's "Technology and Engineering of ROGA Spiral-Wound Reverse Osmosis Membrane Modules" in *Reverse Osmosis and Synthetic Membranes*, S. Sourirajan (Ed), National Research Council of Canada Pub. No. 15627, Ottawa, Canada, 1977, which are incorporated herein by reference.

The module contained approximately one ft$^2$ of active membrane area. A feed stream at a temperature of 17° C. containing various concentrations of trichloroethane in nitrogen was recirculated through the module at a recirculation rate of 71 liters per minute. The average feed pressure was 19 cm Hg above atmospheric pressure while the permeate was maintained at a pressure of 1 cm Hg. The flow of nitrogen and trichloroethane through the module was measured. A plot of feed concentrate versus permeate concentration is shown in Table 1 below.

TABLE 1

Trichloroethane product concentration versus feed concentration for a small 2" diameter silicone rubber spiral module; feed recirculation rate 71 l/m

| Feed Concentration (Vol. %) | 0.5 | 0.75 | 1.04 | 1.22 | 1.45 |
|---|---|---|---|---|---|
| Permeate Concentration (Vol. %) | 13.6 | 18 | 25.4 | 29 | 33 |

EXAMPLE 3

Using the module described in Example 2, a series of experiments was performed in which a simulated oven bleed stream at a feed temperature of 17° C. and a feed pressure of 19 cm Hg above atmospheric pressure was recirculated from the oven through the module and then back to the oven. The permeate was maintained at a pressure of 1 cm Hg. The solvent trichloroethane was added to the oven bleed stream at a rate of 0.17 ml/min. The effect of the bleed stream recirculation rate through the module on the average solvent concentration in the oven and the product stream is shown in Table 2 below.

TABLE 2

Trichloroethane product concentration versus feed concentration for a small 2" diameter silicone rubber spiral module at various feed recirculation rates

| Recirculation Rate (liters/minutes) | 12 | 35 | 48 | 72 |
|---|---|---|---|---|
| Feed Concentration (Volume %) | 1.0 | 0.8 | 0.75 | 0.7 |
| Permeate Concentration (Volume %) | 17 | 18.1 | 18.5 | 18.7 |

EXAMPLE 4

Figure 2:
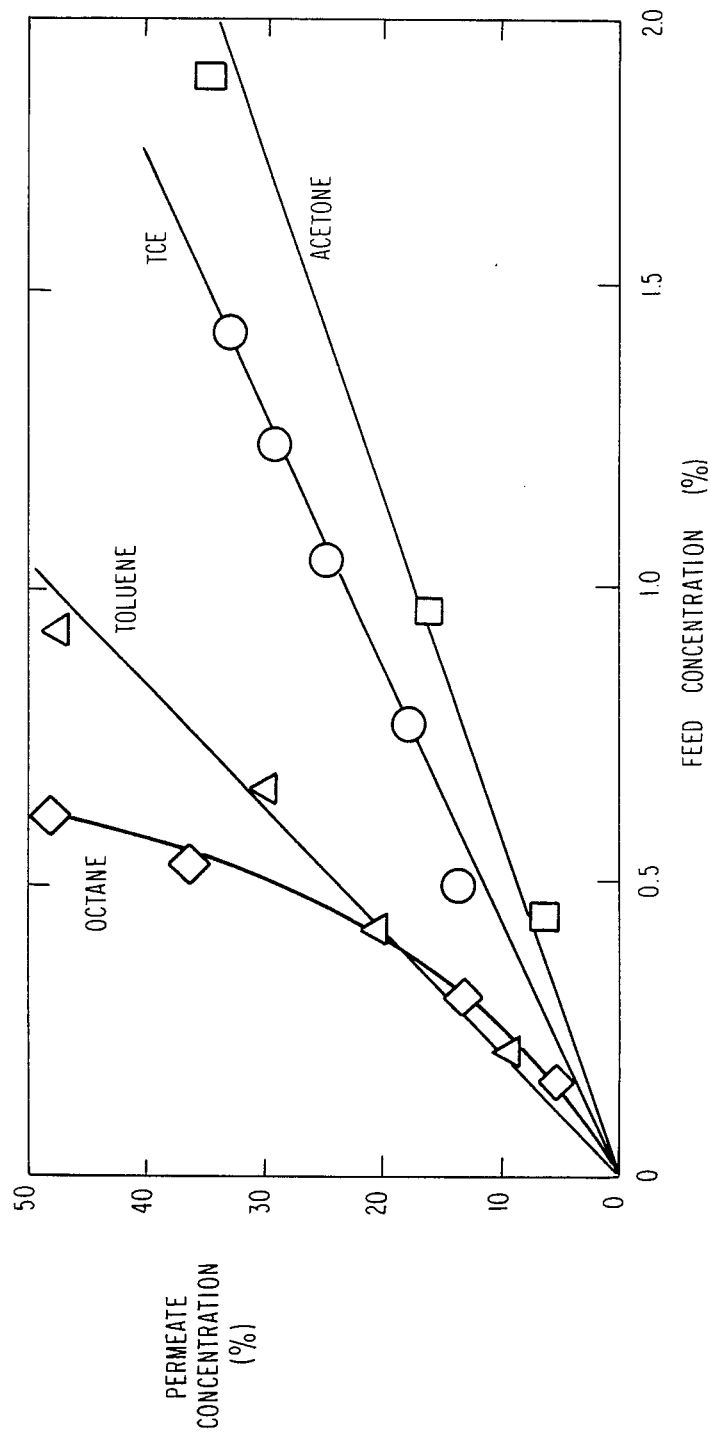
FIG. 2 is a diagram showing product concentration versus feed concentration curves for a series of experiments which employed different solvents in the feed streams and in which the feed solvent concentration was varied.

Using the module described in Example 2, a series of experiments were performed using octane, toluene, trichloroethane and acetone. The feed air stream at a temperature of 17° C. was circulated through the module at a feed pressure of 19 cm Hg above atmospheric pressure at approximately 70 liters/min and the feed solvent concentration was varied from 0 to 2 vol %. The permeate was maintained at a pressure of 1 cm Hg. The product concentration versus feed concentration curves are shown in FIG. 2.

EXAMPLE 5

Figure 3:
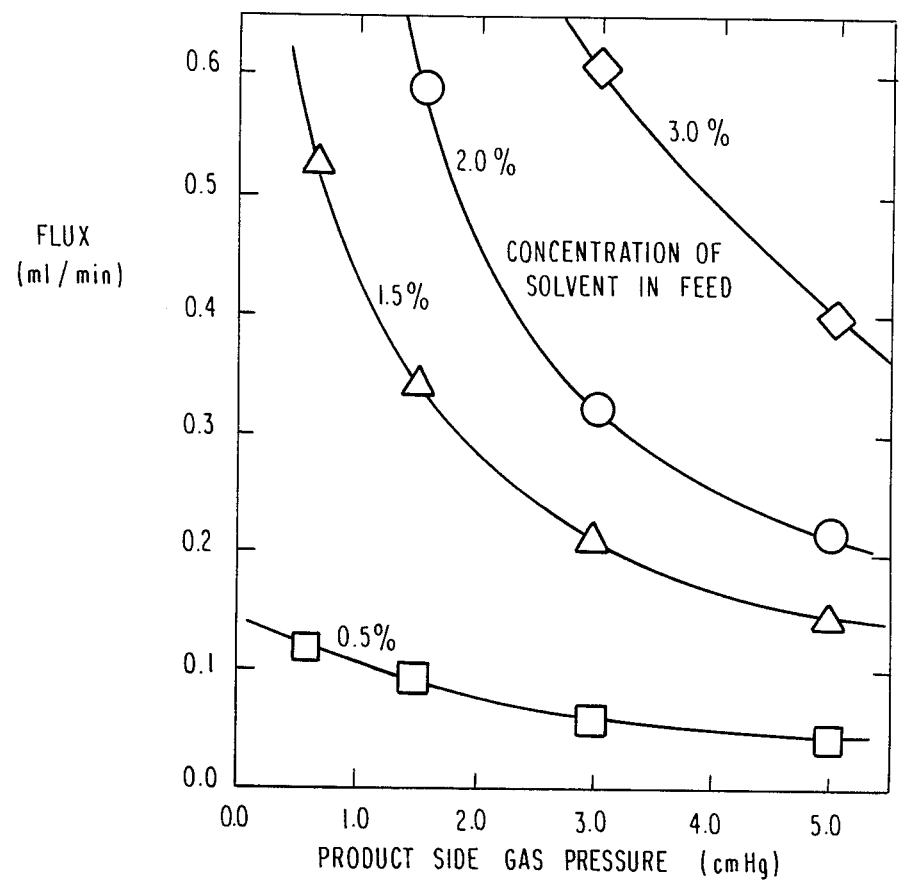
FIG. 3 is a diagram showing a plot of solvent flux through a module versus the actual product side pressure for a series of experiments performed with trichloroethane as solvent.
Figure 4:
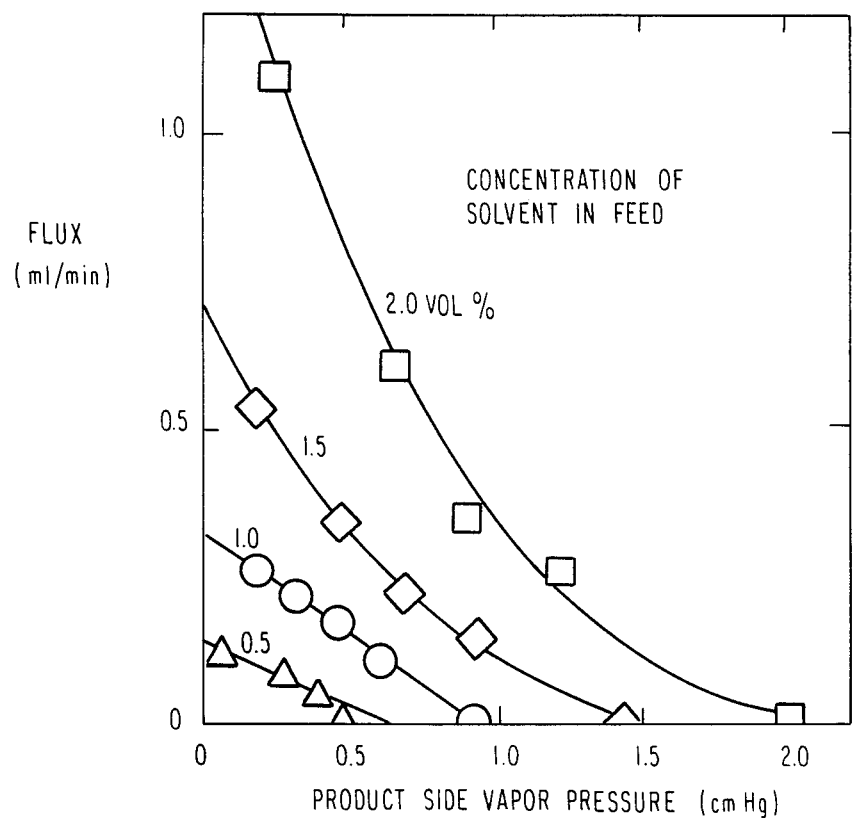
FIG. 4 is a diagram showing a plot of solvent flux through a module versus the calculated product side pressure for the same series of experiments as employed in FIG. 3.

Using the module described in Example 2, a series of experiments were performed with trichloroethane in which the solvent flux through the membrane and concentration of solvent in the product stream were varied as a function of the product side pressure. The feed stream temperature was 17° C. and the feed pressure was 19 cm Hg atmospheric. The solvent flux versus product side pressure is shown in FIG. 3. As these results show, the flux decreases as the product side pressure increases because the vapor pressure of solvent on the product side begins to approach the vapor pressure of the solvent in the feed stream. The product side solvent vapor pressure can be calculated from the product stream pressure multiplied by the product stream solvent concentration. FIG. 4 shows a plot of the solvent flux through the module versus the calculated product side vapor pressure. As expected, the flux decreases with increasing product side vapor pressure and reaches zero when the vapor pressure on the product side of its membrane equals the vapor pressure on the feed side of the membrane.

EXAMPLE 6

A thin silicone rubber composite membrane prepared using the procedure described in Example 1 and having a nominal thickness of 2 μm for the silicone barrier membrane was formed into a spiral wound 2" diameter, 6" long test module as described in Example 2. When a nitrogen stream having a feed temperature of 16° C. and a feed pressure of 15 to 20 cm Hg above ambient pressure, and containing 0.88 vol. % trichloroethane, was passed through the composite membrane at 100 liters/minute, a product stream at a pressure of 1 cm Hg contained 27 vol. % solvent and the total solvent flow through the module corresponded to 0.48 ml per minute. Under the same conditions, a similar module with a 8 micron thick barrier membrane gave a flux of 0.2 ml/min. This example shows the improvement in performance obtained by decreasing the thickness of the silicon rubber barrier membrane.

EXAMPLE 7

Using the silicon rubber membrane from Example 6, a 2" diameter, 12" long module was prepared as described in Example 2. When a nitrogen stream at a feed temperature of 16° C. and a feed pressure of 15 to 20 cm Hg above ambient pressure, and containing 0.66 vol. % trichloroethane was passed through the module at 70 liter/minute, the concentration in the feed stream was reduced to 0.47 vol. %. A permeate flux of 0.48 ml/min trichloroethane was obtained. This result demonstrates that a large fraction of the solvent vapor in the feed stream (about 29%) can be removed on passage of the feed stream through even a single small module. Almost complete removal could be obtained on passing of the feed stream through a single larger module or several small modules in a series.

It will be understood that the above description of the present invention is susceptible to various modifications, changes and adaptations, and the same are intended to be comprehended within the meaning the range of equivalents of the appended claims.

I claim:

1. A process for recovering and concentrating organic vapor from a feed stream of air having an organic vapor content of no more than 20,000 ppm by volume, comprising:

providing a thin semipermeable membrane having a feed side and a permeate side, a selectivity for organic vapor over air of at least 50, as measured by the ratio of organic vapor permeability to nitrogen permeability, and a permeability of organic vapor of at least $3 \times 10^{-7}$ cm$^3$ (STP) cm/cm$^2$ sec·cm Hg, passing the feed stream across the feed side of the thin semipermeable membrane while providing a pressure on the permeate side which is lower than the feed side by creating a partial vacuum on the permeate side such that organic vapor passes preferentially through the membrane to form an organic vapor depleted air stream on the feed side and an organic vapor enriched stream on the permeate side, and compressing and condensing the organic vapor which has passed through the membrane to recover the vapor as a liquid.

2. Process according to claim 1, wherein the thin semipermeable membrane is a rubbery material under the conditions of organic vapor composition of the feed stream and temperature of the feed stream.

3. Process according to claim 2, wherein the semipermeable membrane has a glass transition temperature (Tg) at least 20° C. below the temperature of the feed stream.

4. Process according to claim 1, wherein the vapor-depleted air stream is recirculated.

5. Process according to claim 4, wherein the feed stream has a temperature of at least 50° C.

6. Process according to claim 4, wherein the feed stream has a temperature of at least 100° C.

7. Process according to claim 1, wherein the feed stream has a vapor content of from 0.1 to 1 volume %.

8. Process according to claim 1, wherein the selectivity of the membrane is between 100 and 10,000.

9. Process according to claim 1, wherein the permeability of the membrane to organic vapor is above $1 \times 10^{-6}$ cm$^3$ (STP) cm/cm$^2$ sec·cm Hg.

10. Process according to claim 1, wherein the thin semipermeable membrane is provided as part of a composite membrane comprising a microporous membrane support layer and the thin semipermeable membrane is in the form of a barrier coating layer on the support.

11. Process according to claim 9, wherein the support membrane comprises an organic solvent resistant ultrafiltration membrane.

12. Process according to claim 1, wherein the total pressure on the product side is from 0.2 to 2 cm Hg and the total pressure on the feed side is from 80 to 100 cm Hg.

13. Process according to claim 1, wherein the organic vapor is a naptha, chlorinated hydrocarbon, acetone, ethanol, or methanol.

14. Process according to claim 1, wherein the organic vapor is perchloroethylene or trichloroethane.

15. Process according to claim 1, wherein the concentration of vapor in the organic vapor enriched stream on the permeate side is from 10 to 95 volume percent.

16. Process according to claim 1, wherein the concentration of vapor in the organic vapor enriched stream on the permeate side is from 10 to 70 volume percent.

* * * * *